(12) United States Patent
Chue

(10) Patent No.: US 12,473,042 B2
(45) Date of Patent: Nov. 18, 2025

(54) VEHICLE TRACTION ENHANCEMENT SYSTEM

(71) Applicant: KTISIS, LLC, Rochester Hills, MI (US)

(72) Inventor: Kwing Shun Chue, Rochester Hills, MI (US)

(73) Assignee: KTISIS, LLC, Rochester Hills, MI (US)

( * ) Notice: Subject to any disclaimer, the term of this patent is extended or adjusted under 35 U.S.C. 154(b) by 851 days.

(21) Appl. No.: 17/769,481

(22) PCT Filed: Oct. 14, 2020

(86) PCT No.: PCT/US2020/055609
§ 371 (c)(1),
(2) Date: Apr. 15, 2022

(87) PCT Pub. No.: WO2021/076646
PCT Pub. Date: Apr. 22, 2021

(65) Prior Publication Data
US 2024/0092435 A1   Mar. 21, 2024

Related U.S. Application Data

(60) Provisional application No. 62/915,153, filed on Oct. 15, 2019.

(51) Int. Cl.
*B62D 37/00* (2006.01)
*B60R 16/033* (2006.01)
*F03H 1/00* (2006.01)

(52) U.S. Cl.
CPC ............ *B62D 37/00* (2013.01); *B60R 16/033* (2013.01); *F03H 1/0037* (2013.01)

(58) Field of Classification Search
CPC ...... B60R 16/033; B62D 37/00; F03H 1/0037
(Continued)

(56) References Cited

U.S. PATENT DOCUMENTS 11,072,381 B2 * 7/2021 Favaretto .................. B60T 1/12
2006/0144624 A1   7/2006 Clark, Jr.

FOREIGN PATENT DOCUMENTS

CN   107399291 A   11/2017
CN   109649512 A   4/2019
(Continued)

OTHER PUBLICATIONS

International Search Report and Written Opinion, Application No. PCT/US2020/055609, mailed Feb. 15, 2021.
(Continued)

*Primary Examiner* — Valentin Neacsu
*Assistant Examiner* — Felicia L. Brittman-Alabi
(74) *Attorney, Agent, or Firm* — The Dobrusin Law Firm, P.C.; Daniela M. Thompson-Walters

(57) ABSTRACT

A vehicle with vehicle traction enhancement system providing increased tractive force is disclosed. The traction enhancement system includes a thruster. The thruster includes a prime mover and an air pressure generator. The traction enhancement system further includes an energy storage to provide energy for the prime mover. The thruster is mounted on vehicle chassis structure, body, and/or suspension, substantially vertical to the vehicle to provide an upward thrust to the vehicle to increase the reactive downward normal force to provide the enhanced tractive force.

20 Claims, 10 Drawing Sheets

(58) Field of Classification Search
USPC .......................................................... 180/164
See application file for complete search history.

(56) References Cited

FOREIGN PATENT DOCUMENTS

| | | |
|---|---|---|
| DE | 2500351 A1 | 7/1976 |
| DE | 102008037803 A1 | 2/2010 |
| DE | 102009059803 A1 | 9/2010 |
| EP | 3674152 A1 | 7/2020 |
| WO | 2007144914 A1 | 12/2007 |

OTHER PUBLICATIONS

EP First Communication dated Nov. 13, 2024, Application No. 20801097.5.

\* cited by examiner

VEHICLE TRACTION ENHANCEMENT SYSTEM

FIELD

The present invention relates to automotive technology, and more particularly to the enhancement of vehicle traction.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A good vehicle dynamic performance is primarily determined by proper control of tractive force at each corner of the vehicle where the tire contacts the road surface. The desired vehicle dynamic performance may include vehicle acceleration, deceleration and cornering. The performance goal varies from one driving condition to the other, and therefore the demand of required tractive force may also vary accordingly. When the tire-road contact can provide the required tractive force to meet the need for a specific performance goal, the desired performance can be well delivered. Conversely, when the tire-road contact cannot provide the required tractive force, the vehicle dynamic will fail its desired performance goal.

Vehicle tractive force at the tire is mainly determined by two factors: The tire normal loading force on the road surface and the adhesion coefficient of the road surface. More precisely stating, the vehicle tractive force at each tire is the product of the tire normal loading force and the surface coefficient of adhesion, which means, given the same surface adhesion coefficient, the more tire normal loading force, the larger tractive force at the tire-road contact. The road surface adhesion may change from a high coefficient of around 1.0 on a dry concrete pavement to a low coefficient of around 0.1 on a slippery icy surface. Given the same tire normal loading force, the tractive force will change according to the level of surface adhesion coefficient. Likewise, given the same surface adhesion coefficient, the tractive force will change according to the level of tire normal loading force.

Understandably, a larger tractive force is desired for better vehicle dynamic control; the larger the tractive force the tire-road contact can provide to the vehicle the more responsive performance vehicle can have dynamically. While the road surface is given and cannot be changed by the vehicle or operation thereof, the tire normal force is manageable to a certain degree to have an increased amount of tractive force.

One example is providing additional weight on the driving axle, this can increase the tire normal loading force at that axle via gravitational effect. However, the increase of weight also increases the vehicle mass with a one-to-one ratio. In other words, the amount of weight increase that creates the increase of vehicle tractive force will consume the same amount of vehicle tractive force for its acceleration and deceleration. As a result, the required additional amount of vehicle tractive force to accelerate or decelerate the additional weight compromises if not nullifies the effect of the increased tire normal loading force. Therefore, while increased vehicle weight can increase vehicle tractive force, it does not result in a better vehicle dynamic performance because of the one-to-one ratio of the tractive force increase versus the acceleration force increase: No net force is left for enhancing vehicle dynamic performance further.

Another example is to install spoiler on the vehicle, commonly on top of the trunk lid, this will increase the tire normal load via aerodynamic effect to create a downward force when the vehicle speed is substantially high without significant increase of the vehicle mass. The amount of aerodynamic downforce generated by a spoiler is proportional to the square of the vehicle speed. However, the effect of the spoil is subject to limitations arising out of its pre-determined characteristic based on vehicle speed. One limitation is that the downward force exerted on the vehicle is mainly dependent on vehicle speed, the magnitude of this downward force cannot be controlled. The other limitation is that the aerodynamic effect on the spoiler is nearly negligible as to render substantially no effect when the vehicle is operated at low speed (For example, if a vehicle has 100 pounds of downforce at 140 mph, it only has 25 pounds of downforce at 70 mph). Yet another limitation of the spoiler is its constraint on the locations that could be installed on the vehicle to create the aerodynamic effect.

In addition, previous attempts have been made to create vacuum underneath a vehicle by using a mechanical suction system to suck the vehicle down in order to increase tire tractive force. However, such a system's effectiveness is significantly compromised by sucking up dirt, dust, and other objects from the road surface. Moreover, the system's performance is heavily affected by the vehicle's ride-height and it is difficult to maintain a consistent ride height while the vehicle is in operation. It can be dangerous to operate such a vehicle if the amount of vacuum underneath the vehicle is not consistent or predictable because it will decrease the tire tractive force instantaneously and the driver can lose control of the vehicle.

Therefore, it is the objective of this invention to solve the problem of a controllable increase of vehicle tractive force independent of vehicle speed, regardless of road conditions, and can be activated or deactivated at any time without significant increase of the vehicle mass so as to enhance the vehicle dynamic performance under various conditions. The vehicle traction enhancement system disclosed in this invention has the following advantages over the prior arts:

Advantageously, the vehicle traction enhancement system can provide a controllable increase of vehicle tractive force independent of the vehicle speed.

Advantageously, the vehicle traction enhancement system can create a much larger tractive force compared to the amount of force for its inertial acceleration, therefore provides desired enhancement of vehicle dynamic performance.

Advantageously, the vehicle traction enhancement system can be realized using technologies with parts and components available without undue effort for implementation.

Further advantageously, the vehicle traction enhancement system has a high degree of flexibility on the location of its installation on a vehicle to create various forms of vehicle architecture. Such flexibility further enhances the purpose of this invention: Providing various increased tire tractive force to the vehicle for the various dynamic performance needs.

Advantageously, the vehicle traction enhancement system can be activated or deactivated at any time by the operator or automatically based on the system settings.

SUMMARY

A vehicle with traction enhancement system includes a chassis structure carrying vehicle chassis components for vehicle motion operation. The chassis structure further carries a plurality of wheels that bear tractive force at wheel-road surface contacts for vehicle motion operation. The vehicle traction enhancement system provides increase of tractive force at the wheel-road surface contacts. In the vehicle traction enhancement system, there are an energy storage and a thruster to provide the enhanced tractive forces.

The energy storage provides energy for operation of the vehicle traction enhancement system. The thruster is in energy-flow communication with the energy storage. The thruster is mounted on the vehicle chassis structure. The axis of the thruster is substantially vertical to the road surface. The thruster provides an upward thrust with respect to the vehicle to generate an increased reactive downward normal force at tire-road contact surfaces using the energy received from the energy storage, The amount of energy received by the thruster to generate the upward thrust is subject to a thruster control signal.

The thruster control signal is generated by a thruster control module. The thruster control module is in electrical communication with the thruster to communicate the thruster control signal to the thruster. The thruster control module is further in electrical communication with a vehicle control module. The vehicle control module operates the thruster control module based on a need of vehicle motion operation.

The thruster may include a propulsion system. The propulsion system may include a prime mover, an air pressure generator, or a combination thereof to convert energy received from an energy storage to ultimately generate a thrust via the thruster. Furthermore, a compressor, pump, and/or a pressure vessel may be used to generate thrust by pressurizing a fluid within the compressor, pump, and/or pressure vessel. For example, the fluid may be air, carbon dioxide, nitrogen, water vapor, or a combination thereof used to generate a thrust. Similarly, it is contemplated that the thrust may also be generated by one or more combustion engines. Thus, it may be gleaned from the teachings herein that a variety of methods and/or configurations may be used to generate an acceptable thrust for the vehicle traction enhancement system.

The vehicle may be equipped with one or more thrusters mounted on a location near a driven axle.

The vehicle may also be equipped with two or more thrusters mounted over the two driven axles.

The vehicle may also be equipped with four or more thrusters mounted near the four corners of the vehicle.

Further areas of applicability of the present disclosure will become apparent from the detailed description provided hereinafter. The detailed description and specific examples herein are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
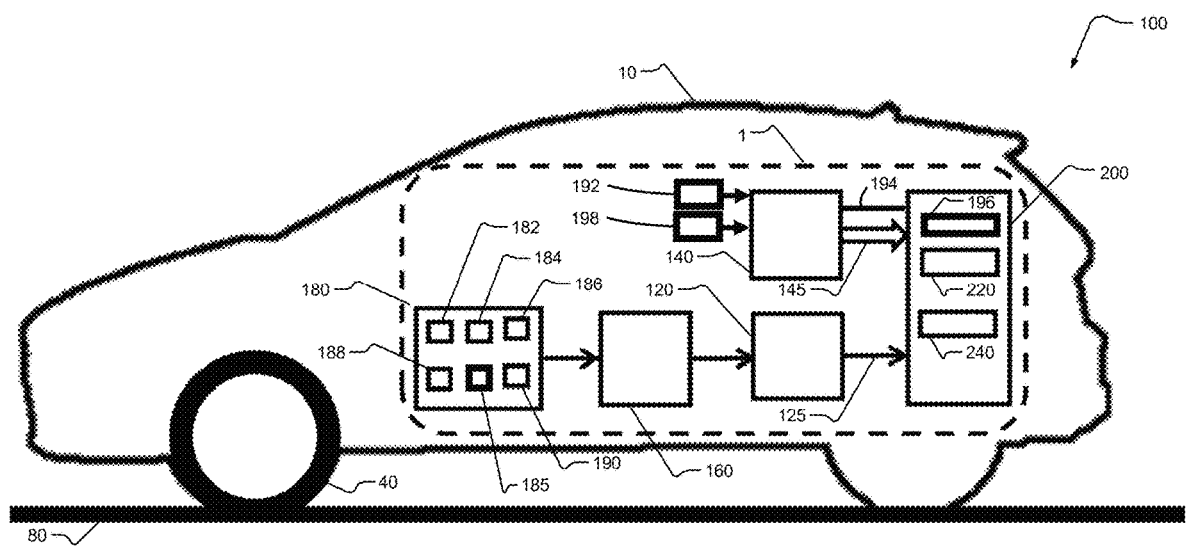
FIG. 1 is a schematic diagram of a vehicle equipped with vehicle traction enhancement system according to the present invention.

The following description is merely exemplary in nature and is in no way intended to limit the disclosure, its application, or uses. For purposes of clarity, the same reference numbers with or without prime symbols, whether single or multiple counts of such symbol, appended thereto will be used in the drawings to identify similar elements.

Referring to FIG. 1, a schematic diagram of a vehicle equipped with vehicle traction enhancement system 100 according to the present invention is shown. The vehicle 10 may include tires 40 making contacts with the ground surface 80; and the vehicle 10 is equipped with a vehicle traction enhancement system 1. The vehicle traction enhancement system 1 may include a thruster 200 that produces thrust force for vehicle traction enhancement. The vehicle traction enhancement system 1 may also include an energy storage 140 to supply energy required for the operation of the thruster 200. The vehicle traction enhancement system 1 may also include a thrust control module 120 that regulates the amount of energy to be used for the desired performance of the thruster 200.

The vehicle traction enhancement system 1 may also include a vehicle control module 160 that determines the desired performance of the thruster 200 according to a vehicle performance target. The vehicle traction enhancement system 1 may also include a set of sensing devices 180 that provides signals for the vehicle control module 160 to determine the vehicle performance target. The set of sensing devices 180 may include a gyroscope 182 to sense the vehicle rotational motion, an accelerometer 184 to sense the vehicle linear acceleration, a vehicle speed sensor 185 to sense the vehicle speed, a steering angle sensor 186 to sense the driver's desire of vehicle turning motion, a throttle position sensor 188 to sense the driver's desire of vehicle speed, and a brake pressure sensor 190 to sense the driver's desire of vehicle braking motion.

The set of sensing device may be electrically connected to the vehicle control module 160. The vehicle control module 160 may be electrically connected to the thrust control module 120. The thrust control module 120 may be electrically connected to the thruster 200 and may provide control signals to the thruster 200 via a control signal line 125.

In one instance, the energy storage 140 may be an electric battery storing electric energy to be supplied to the thruster. The energy storage 140 may be electrically connected to the thruster 200 via an electrical connection of an energy supply line 145. The thrust control module 120 may regulate the amount of electric energy to be used in the thruster 200 via control signal communicated to the thruster 200 via the control signal line 125.

In another instance, the energy storage 140 may be a fuel tank storing petrochemical fuel to be supplied to the thruster. The energy storage 140 may be mechanically connected to the thruster 200 via a mechanical connection of an energy supply line 145. The thrust control module 120 may regulate the amount of fuel to be used in the thruster 200 via control signal communicated to the thruster 200 via the control signal line 125.

It should also be noted that the energy storage 140 may also store any pressurized fluid in one or more vessels that may be distributed to the thruster 200 to generate a thrust as described herein. For example, a compressor 192 or pump 198 may be connected to the energy storage 140 that compresses the fluid within the energy storage 140 vessels, thereby creating a pressurized fluid to distribute to the thruster 200 when desired. Similarly, a regulator 194 may be located between the energy storage 140 and the thruster 200 so that a pressure of the fluid being received by the thruster 200 from the energy storage 140 may be regulated to a desired pressure. The thruster 200 may include a control valve 196 to release the pressurized fluid based on a control signal received from the thrust control module 120 via the control signal line 125 to generate the desired force for vehicle traction force enhancement.

Moreover, it is also envisioned that the energy storage 140 may be and/or include an ultracapacitor or supercapacitor. Thus, beneficially the energy storage 140 may release a significantly higher amount of power and be recharged significantly quicker when compared to a conventional capacitor or battery, thereby providing the thrusters 200 additional power for higher performance.

The thruster 200 may also include a propulsion system 238 to generate a thrust. The propulsion system 238 may include one or more components within the thruster 200 to increase pressure of a working fluid within the thruster 200, increase momentum of the working fluid within the thruster 200, or both. The propulsion system 238 may be configured to propel the working fluid through the thruster 200 to generate the thrust. The propulsion system 238 may be any number of components within the thruster 200 to generate such a thrust. For example, the propulsion system 238 may include a fan propulsion system, a turbo-fan, a jet engine, a combustion engine, a plasma engine, an electromagnetic propulsion system, an ion thruster, or a combination thereof. For example, in one particular configuration, the propulsion system 238 may include a prime mover 220 and an air pressure generator 240. The prime mover 220 may receive the energy provided via the energy supply line 145 to operate the air pressure generator 240 based on a control signal received from the control signal line 125 to generate the desired force for vehicle traction force enhancement according to the principle described in FIG. 2.

However, it should also be noted that while the above example describes a propulsion system 238 having a prime mover 220 and an air pressure generator 240, other configurations for the propulsion system 238 may be possible. The propulsion system 238 may be free of a prime mover 220, an air pressure generator 240, or both. For example, the propulsion system 238 may receive a high-pressure fluid directly from the energy storage 140 that generates a desired thrust by the thruster 200 without needing to increase pressure, momentum, or both of the high-pressure fluid via a prime mover 220. Thus, it may be gleaned from the present teachings that the propulsion system 238 is not limited to one particular configuration for generating a desired thrust and may include one or more interchangeable system components based on a given application.

Figure 2:
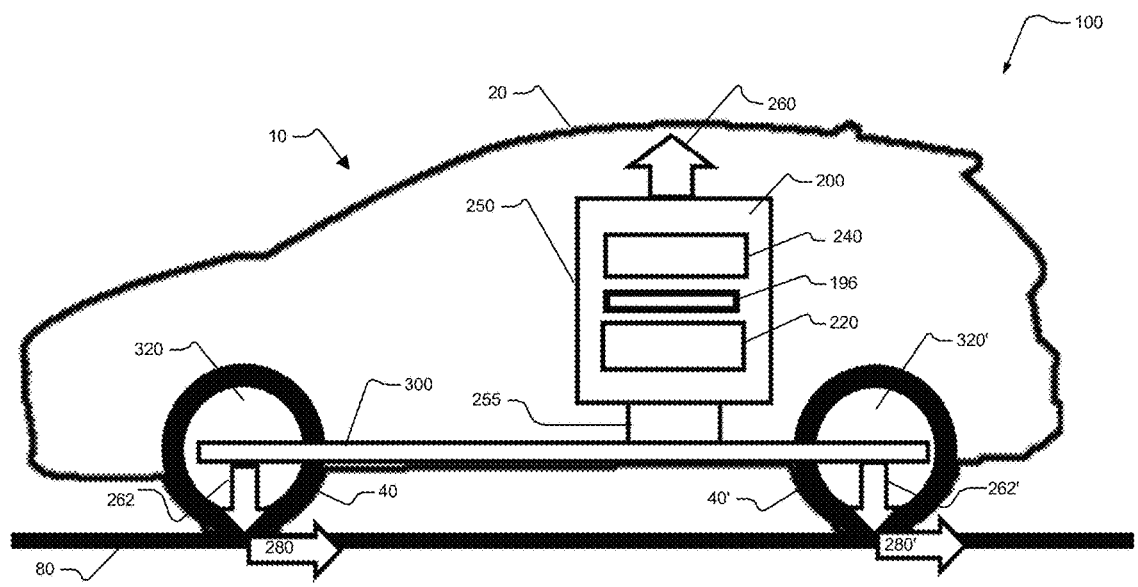
FIG. 2 is a functional diagram illustrating the operating principle of the vehicle traction enhancement system.

Referring now to FIG. 2, a functional diagram illustrating the operating principle of the vehicle traction enhancement system 100 is shown. The thruster 200 may include a thruster housing 250 to hold the thruster components such as a propulsion system 238. As shown in FIG. 2, the propulsion system 238 may include a prime mover 220 in communication with an air pressure generator 240 contained within the thruster housing 250. The thruster housing 250 may be mechanically connected to the vehicle chassis structure 300 via a thruster mount 255 so that the thruster housing 250 may be at least partially contained within a body 20 of the vehicle 10. The chassis structure 300 may be mechanically connected to the tire 40 via a vehicle suspension 310. The suspension 310 may be mechanically connected to a wheel assembly 320, and the wheel assembly 320 may be mechanically connected to the tire 40.

The air pressure generator 240 may generate an upward thrust 260. A force reacting to the upward thrust 260 exerted on the thruster 200 is transmitted via the thruster housing 250, the thruster mount 255, the chassis structure 300, the suspension 310 and the wheel assembly 320 to result in a reactive downward normal force 262 exerted on the ground surface 80 via the tire 40. The downward normal force 262 thus provides the desired increase of tractive force 280 to meet the requirement of the vehicle dynamic performance goal.

In one embodiment, the prime mover 220 of the thruster 200 is electric-driven. The thruster 200 converts the received electric energy to kinetic energy to create the upward thrust 260 via an air pressure generated by the air pressure generator 240 driven by the prime mover 220. More specifically, the electric-driven prime mover 220 may be an electric motor, and the air pressure generator 240 may be a fan. Additionally, the thruster 200 may include a control valve 196 to release the pressurized fluid to generate the desired force for vehicle traction force enhancement system.

In another embodiment, the prime mover 220 of the thruster 200 is propelled by energy generated by petrochemical power machine. The thruster 200 coverts the received petrochemical energy to kinetic energy to create the upward thrust 260 via an air pressure generator 240 driven by the prime mover 220. More specifically, the prime mover 220 may be a combustion engine, and the air pressure generator 240 may be a fan.

Due to conversion of energy stored in the energy storage 140 to the upward thrust 260, the force generated by the upward thrust 260 can be order of magnitude larger than the gravitational force of the thruster 200. As a result, the tractive force 280 so generated at the tire-road contact can be order of magnitude larger than the force required to accelerate the inertia of the thruster 200. The tractive force enhancement system 1 can provide the required tractive force 280 sufficient for the desired enhancement of vehicle dynamic performance. It is also envisioned that the energy storage 140 may contain a solid-state fuel that, when undergoing a phase change (e.g., from solid to liquid, from solid to gas, etc.), increases in pressure to generate a thrust via the thruster 200.

Figure 3:
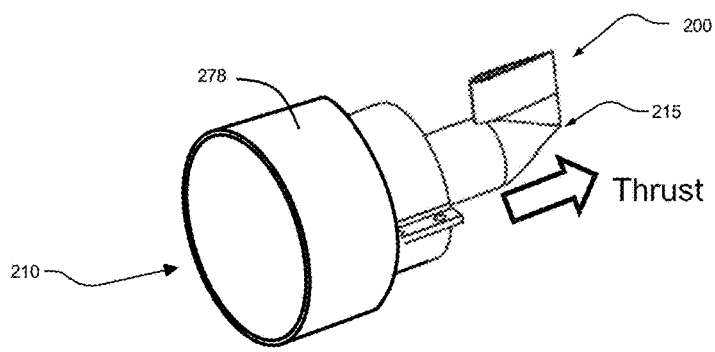
FIG. 3 is an illustration of an example thruster.
Figure 3A:
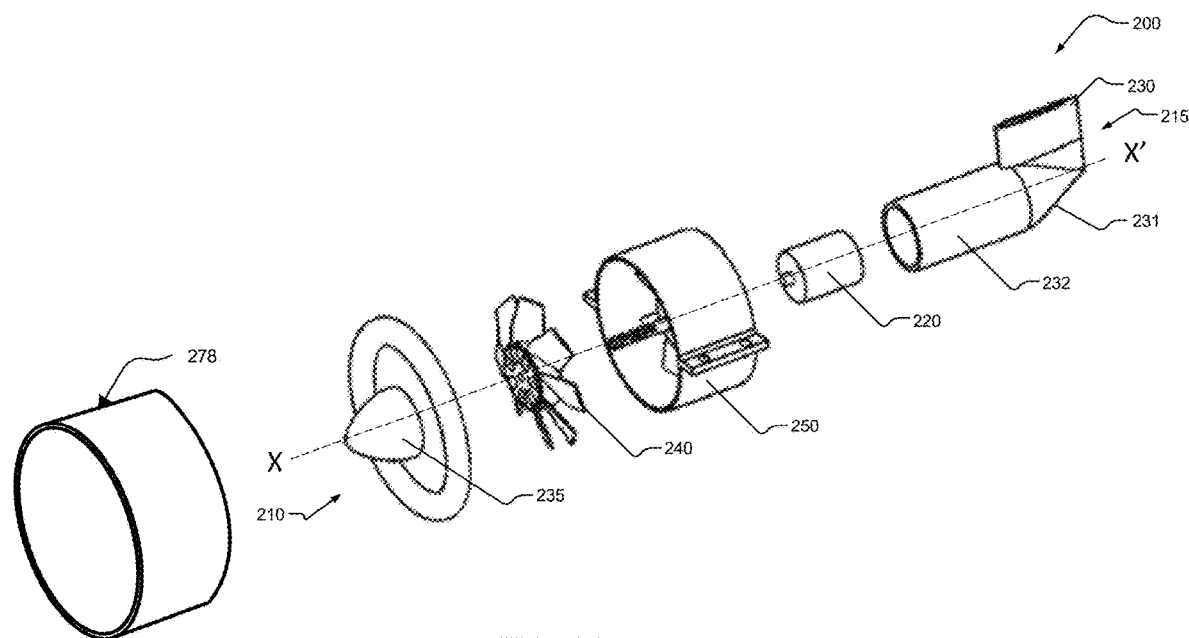
FIG. 3A is the exploded view thereof for the vehicle traction enhancement system.

Referring to FIG. 3A, an exploded view of an example thruster 200 for the vehicle traction enhancement system, as shown in FIG. 3, is shown. The thruster 200 may include a thruster housing 250 wherein an electric motor stator is firmly fixed, a prime mover 220 which is an electric motor, an air pressure generator 240 which is a fan driven by the electric motor. The thruster 200 has an intake end 210 where air flow comes into the thruster 200. The thruster 200 also has an exhaust end 215 where accelerated air exhaust exits from the thruster 200. The thruster 200 may include, at its intake end, a rotor cone 235 connected to the air pressure generator 240. The prime mover 220, the air pressure generator 240, the rotor cone 235 are connected along a common rotating axis X-X'. The thruster 200 may also include, at its intake end, an inlet duct 278 connected to the thruster housing 250.

Air is taken in at the intake end of the thruster 200 through around the rotor cone 235, and the air pressure so built is sent over to the exhaust end of the thruster 200 to create thrust force. The thruster 200 may also include an air stream stabilizer 230 at its exhaust end to increase the efficiency of the thrust generation. The stabilizer 230 may further include an aft cone 231 and a stator extension 232 which is fixed to the thruster housing 250.

Figure 4A:
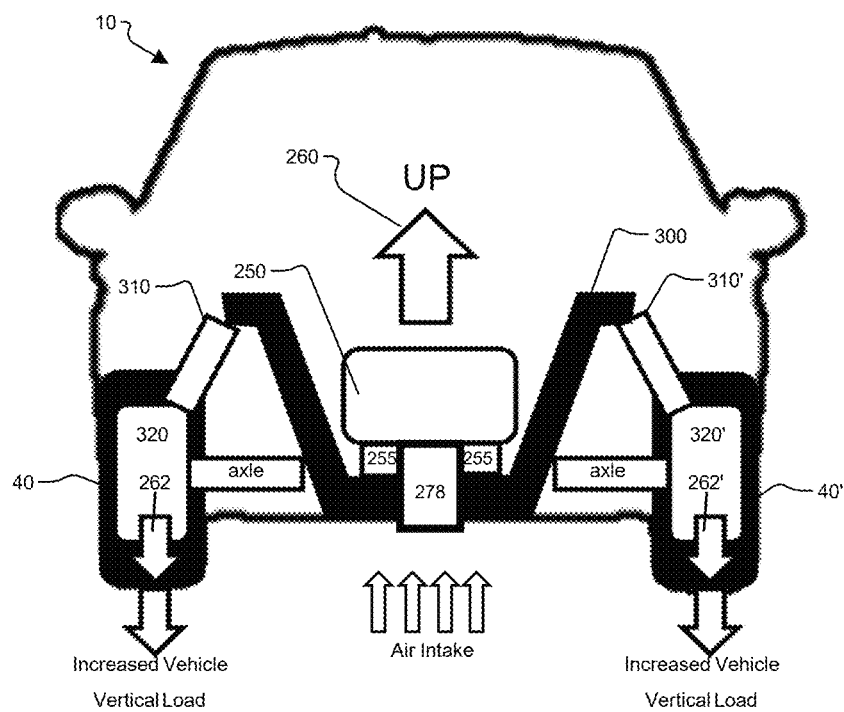
FIG. 4A is a schematic diagram showing the configuration of the vehicle traction enhancement system with a thruster.

Referring now to FIG. 4A a schematic diagram showing the configuration of the vehicle traction enhancement system with the example thruster 200 illustrated in FIG. 3 is shown. However, it should be noted that the vehicle traction enhancement system may include a similar configuration as that shown but include one or more thrusters 200 having a different configuration to that shown in FIG. 3 (e.g., a turbine and/or solid fuel based thruster). The vehicle traction enhancement system is so configured that the thruster 200 is mounted on the vehicle with its intake-end rotor cone 235 facing downwards and its exhaust-end aft cone 231 facing upwards. Thus, the thruster 200 may intake air from beneath the vehicle 10 or anywhere adjacent to the vehicle through inlet duct 278 to generate a thrust. The thrust generated by the thruster 200 thus becomes an upward thrust 260.

The thruster housing 250 is connected to a thruster mount 255 which is further connected to the vehicle chassis structure 300. Therefore, the upwards thrust 260 generated by the thruster 200 results in a reaction force to the vehicle chassis structure 300. Since the reaction force so generate is always working in the opposite direction of the upward thrust 260 as dictated by the fundamental principle of physics, the upward thrust 260 will create a reactive downward force with equal magnitude to the chassis structure 300.

While the vehicle suspension 310 is mechanically connected to the chassis structure 300 at one end, and the suspension 310 is also connected to the wheel assembly 320 at the other end through a set of bearings (not shown), the downward reaction force generated by the upward thrust 260 is thus transmitted to the wheel assembly 320 while the wheel rotates in motion. As the wheel assembly 320 is mechanically connected to the tire 40 rigidly. All the downward reaction force will be transmitted to the tire-road contact surface to create a downward normal force 262.

Figure 4B:
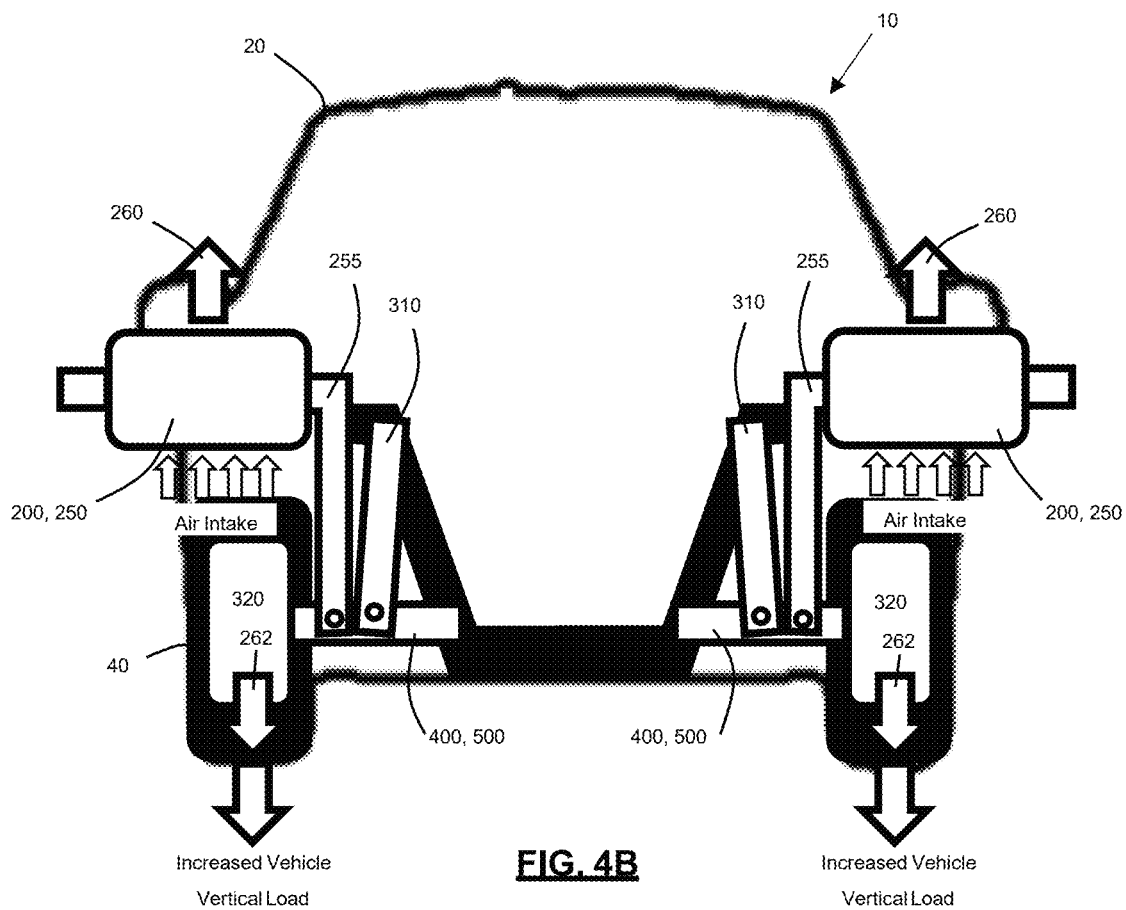
FIG. 4B is a schematic diagram showing the configuration of the vehicle traction enhancement system with a plurality of thrusters.

Similarly, FIG. 4B illustrates a schematic view of the configuration of a vehicle traction enhancement system having a plurality of thrusters 200 as illustrated in FIG. 3. However, it should be noted that the vehicle traction enhancement system may include a similar configuration as that shown but include one or more thrusters 200 having a different configuration to that shown in FIG. 3 (e.g., a turbine and/or solid fuel based thruster). As shown, the thrusters 200 may be located within thruster housings 250 and mounted to the lower control arms 400, 500 and/or chassis of the vehicle 10. For example, the thruster housings 250 may be secured to a control arm, knuckle, axle, wheel hub, vehicle suspension, other wheel and/or chassis linkage, or a combination thereof via a thruster mount 250. While FIG. 4A illustrates a single thruster disposed centrally along an axle of the vehicle, FIG. 4B shows a thruster 200 disposed over each wheel assembly 320 connected by a front control arm 400 or rear control arm 500. Thus, the thrusters 200 may be mounted over each of four wheel assemblies 320 of a vehicle 10 or may only be mounted over a pair of wheel assemblies 320. However, it should also be noted that the thrusters 200 may be mounted over the structure and body 20 of any vehicle. For example, the thrusters 200 may be mounted on a two-wheel vehicle such as a motorcycle, snowmobile, a land vehicle, a marine vessel such as a boat or other aquatic vehicle, commercial vehicles, etc.

The thrusters 200 may be configured to generate an upward thrust 260 based upon the thrusters 200 intaking air from beneath the vehicle 10, from areas adjacent to the vehicle 10, or both, such that a reactive downward force 262 is generated and translated through the suspension 310 and/or chassis structure of the vehicle 10. The downward force 262 may then travel through the vehicle 10 towards the ground, thereby increasing the vehicle's 10 vertical load on the ground via and improving traction between the tires 40 and the ground.

Figure 4C:
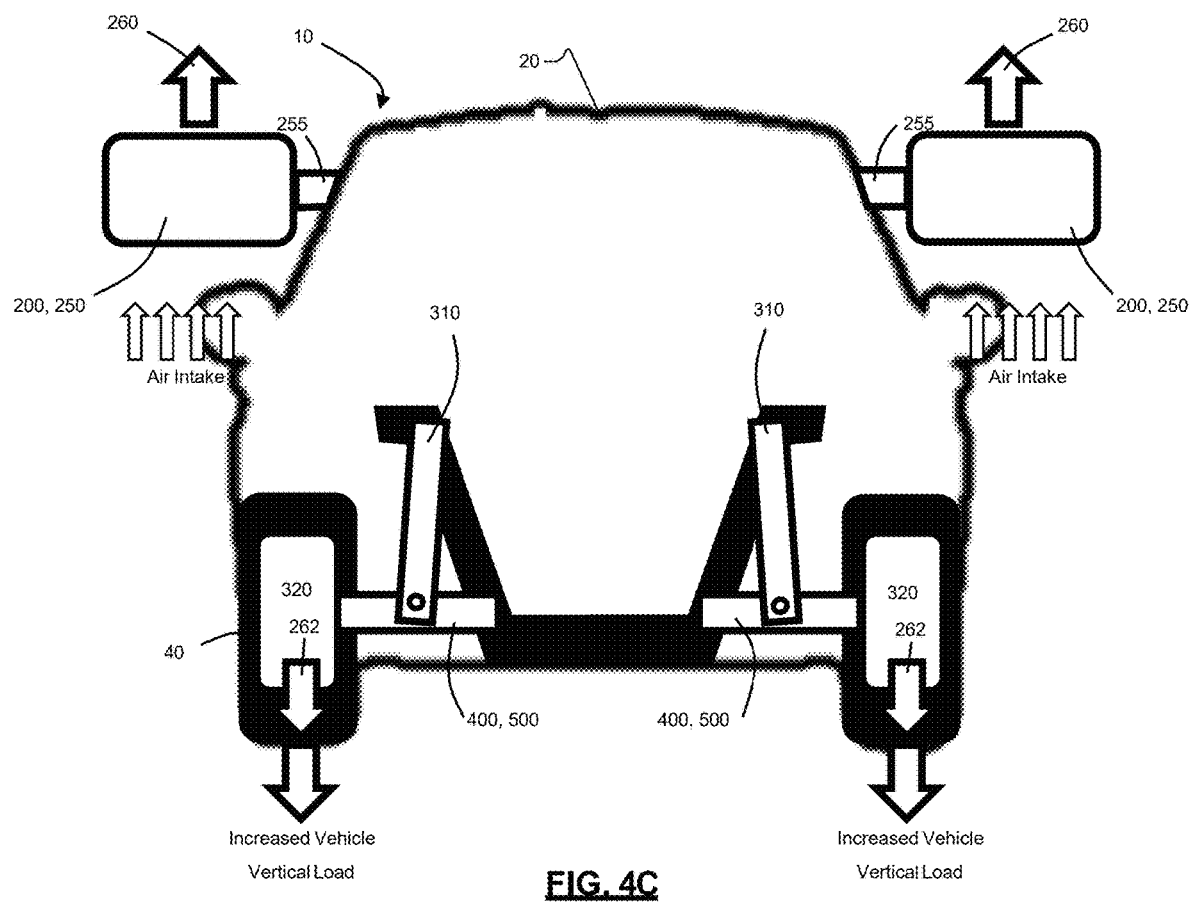
FIG. 4C is a schematic diagram showing the configuration of the vehicle traction enhancement system with a plurality of thrusters mounted to the body of a vehicle.

Similarly, FIG. 4C illustrates a schematic view of the configuration of a vehicle traction enhancement system having a plurality of thrusters 200 as illustrated in FIG. 3. However, it should be noted that the vehicle traction enhancement system may include a similar configuration as that shown but include one or more thrusters 200 having a different configuration to that shown in FIG. 3 (e.g., a turbine and/or solid fuel based thruster). As shown, the thrusters 200 may be located within thruster housings 250 and mounted to the body 20 of the vehicle 10 through thruster mounts 255.

The thrusters 200 may be synchronized so that each thruster 200 generates an upward thrust 260 substantially simultaneously. Thus, the thrusters 200 may provide an even distribution of increased vehicle load near each of the tires 40. However, beneficially the thrusters 200 may also operate independently yet in conjunction with each other within the system. Thus, the thrusters 200 may generate an upward thrust 260 at different times based on an input from one or more sensors within the vehicle traction enhancement system, one or more sensors within the vehicle, or both. For example, due to driving conditions at times being uneven or affecting the vehicle 10 disproportionally near different tires 40, only a portion of thrusters 200 may need to generate an upward thrust 260. As a result, the vehicle traction enhancement system may beneficially act as a dynamic system and distribute power to each thruster 200 based on current driving needs to maintain an overall stable condition with improved traction.

Figure 5A:
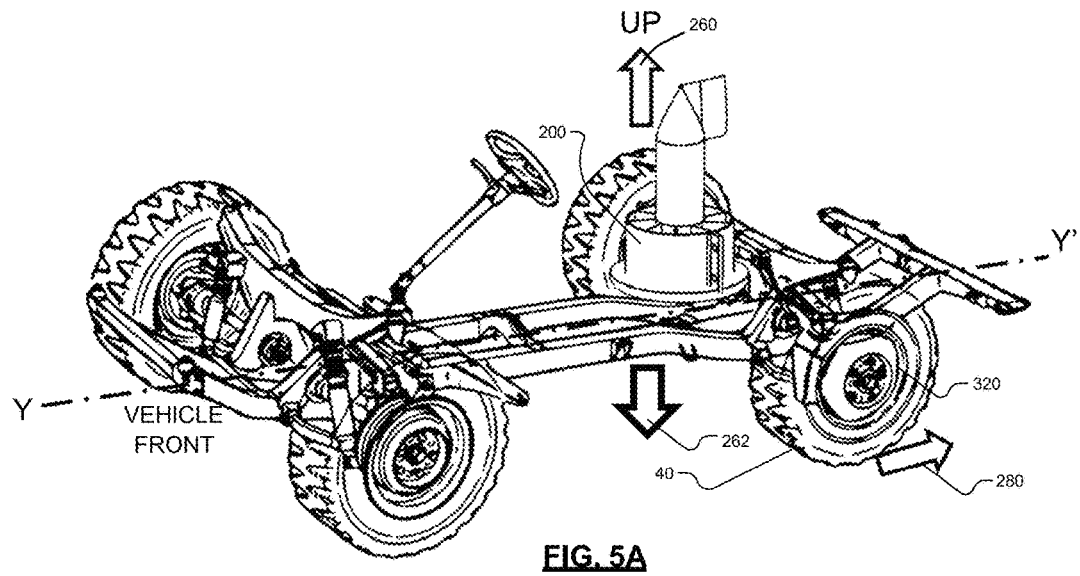
FIG. 5 is a perspective view of the vehicle traction enhancement system construction.

Referring now to FIG. 5A a perspective view of the vehicle traction enhancement system configuration illustrated in FIG. 4A is shown. In this embodiment of the vehicle traction enhancement system, the thruster 200 is mounted substantially vertical to the vehicle ground-plane surface along the vehicle center line YY'. The thruster 200 may be mounted at a middle location between the two tires with substantially equal distances to each of the tires to distribute the downward normal force 262 to the two tires in substantially equal amount. However, the thruster 200 may also be off-centered from the center line YY' if desired, such as for packaging constraints, distribution of weight, etc.

Figure 5B:
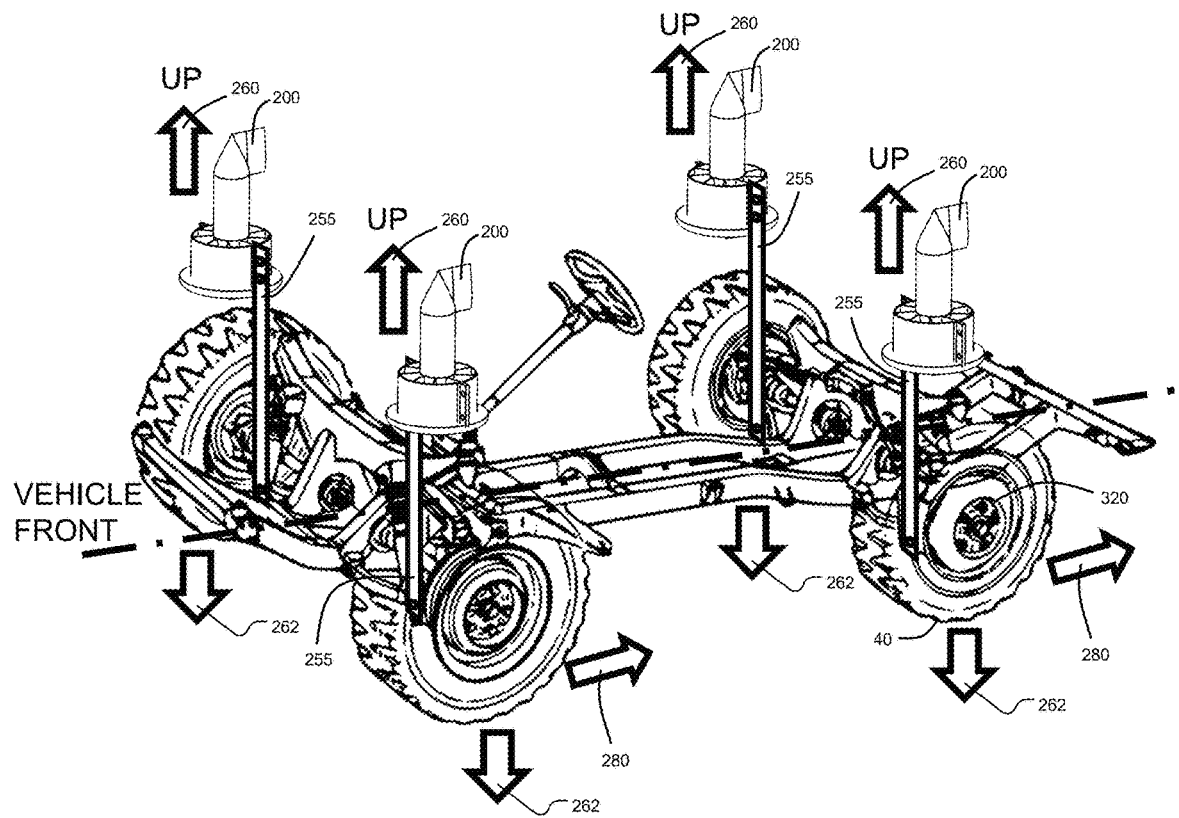

Referring now to FIG. 5B, a perspective view of the vehicle traction enhancement system configuration illustrated in FIG. 4B is shown. As shown, the thrusters 200 are mounted substantially vertical to the vehicle ground-plane surface above each wheel assembly 320. The thrusters 200 may be mounted via a thrust mount 255 to any desired portion of the vehicle's suspension 310, chassis structure 300, body 20, or a combination thereof based on a given application or vehicle platform. An upward force 260 generated by the thrusters 200 may create a tractive force 280 between the tires 40 and the ground, thereby beneficially generating improved traction between the vehicle and the ground.

Figure 6:
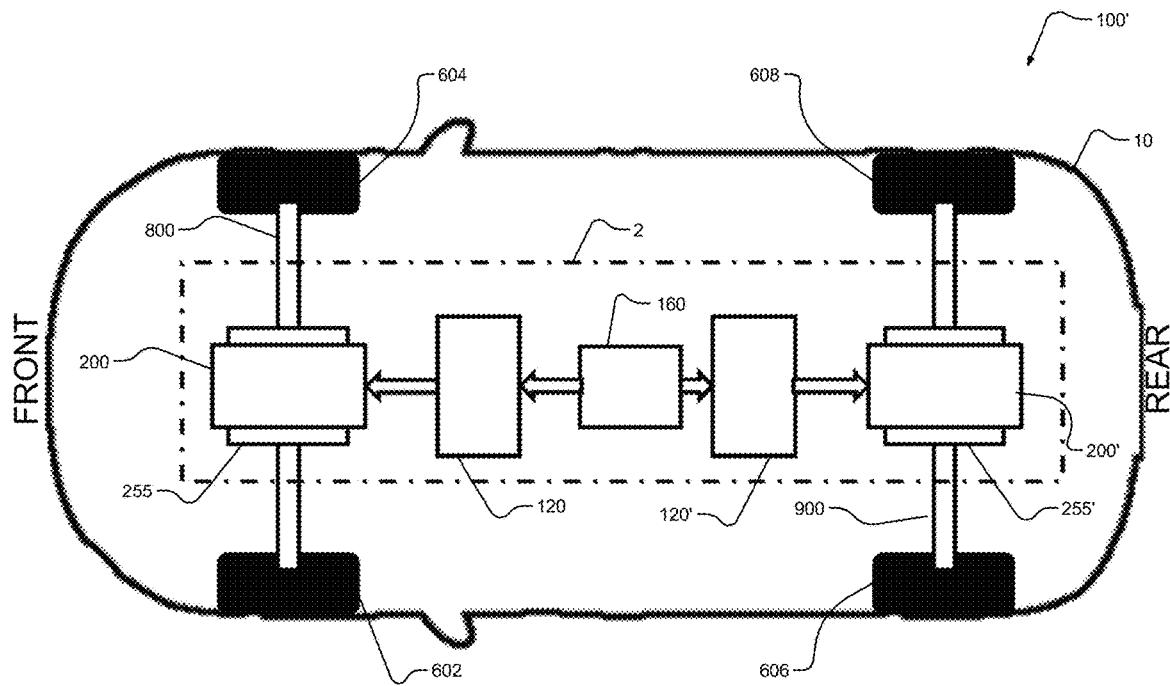
FIG. 6 is a schematic diagram of an example vehicle equipped with independent vehicle traction enhancement systems operating at the two individual axles.

Referring now to FIG. 6 a schematic diagram of a vehicle 100' equipped with another embodiment of vehicle traction enhancement system with dual axle thrusters 2 is shown. The vehicle 100' may have a front axle 800 and a rear axle 900. The front axle 800 may be mechanically connected to a left front wheel 602 and a right front wheel 604 to be driven by a vehicle propulsion system (not shown). The rear axle 900 may be mechanically connected to a left rear wheel 606 and a right rear wheel 608 to be driven by the vehicle propulsion system (not shown).

The vehicle traction enhancement system with dual axle thrusters 2 may include a thruster 200 installed between the left front wheel 602 and the right front wheel 604 over the middle location of the front axle 800. The vehicle traction enhancement system with dual axle thrusters 2 may also include a thruster 200' installed between the left rear wheel 606 and the right rear wheel 608 over the middle location of the rear axle 900. The intake ends of the thrusters 200 and 200' are installed to face downwards, substantially the same way as the thruster configuration in FIG. 4 so as to generate upwards thrust force to create additional downward reactive normal force at the tire-road contact of each axle for enhanced vehicle traction.

The vehicle traction enhancement system 2 may include a front axle thrust control module 120 to operate the front axle thruster 200. The vehicle traction enhancement system 2 may also include a rear axle thrust control module 120' to operate the rear axle thruster 200'. The vehicle traction enhancement system 2 may also include a vehicle control module 160 to operate the front axle thrust control module 120 and the rear axle thrust control module 120' based on signals received from a set of vehicle sensing devices 180 (not shown).

Figure 7:
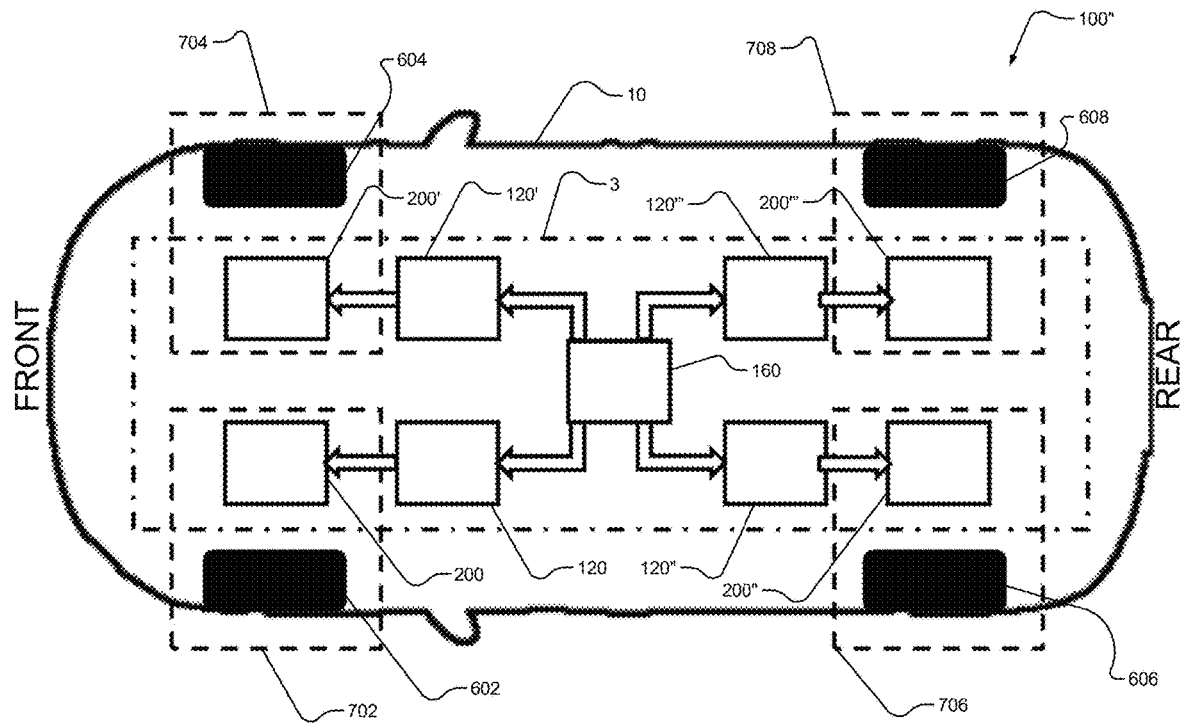
FIG. 7 is a schematic diagram of an example vehicle equipped with independent vehicle traction enhancement systems operating at the four individual wheels.

Referring now to FIG. 7 a schematic diagram of a vehicle 100" equipped with yet another embodiment of vehicle traction enhancement system with quadruple corner thrusters 3 is shown. The vehicle 100" may have a left front wheel 602, a right front wheel 604, a left rear wheel 606 and a right rear wheel 608, each wheel is driven by its respective propulsion system (not shown).

The vehicle traction enhancement system with quadruple corner thrusters 3 may include a left front thruster 200 installed at the left front corner of the vehicle 100", a right front thruster 200' installed at the right front corner of the vehicle 100', a left rear thruster 200" installed at the left rear corner of the vehicle 100', and a right rear thruster 200''' installed at the right rear corner of the vehicle 100'. The intake ends of the thrusters 200, 200', 200' and 200''' are installed to face downwards, substantially the same way as the thruster configuration in FIG. 4 so as to generate upwards thrust force to create additional downward reactive normal force at the tire-road contact of each vehicle corner for enhanced vehicle traction.

The vehicle traction enhancement system with quadruple corner thrusters 3 may include a left front thrust control module 120 to operate the left front thruster 200, a right front thrust control module 120' to operate the right front thruster 200', a left rear thrust control module 120" to operate the left rear thruster 200", and a right rear thrust control module 120''' to operate the right rear thruster 200'''.

The vehicle traction enhancement system with quadruple corner thrusters 3 may include a vehicle control module 160 to operate the left front thrust control module 120, the right front thrust control module 120', the left rear thrust control module 120" and the right rear thrust control module 120''' based on signals received from a set of vehicle sensing devices 180 (now shown here yet similar to that illustrated in FIG. 1).

Figure 8:
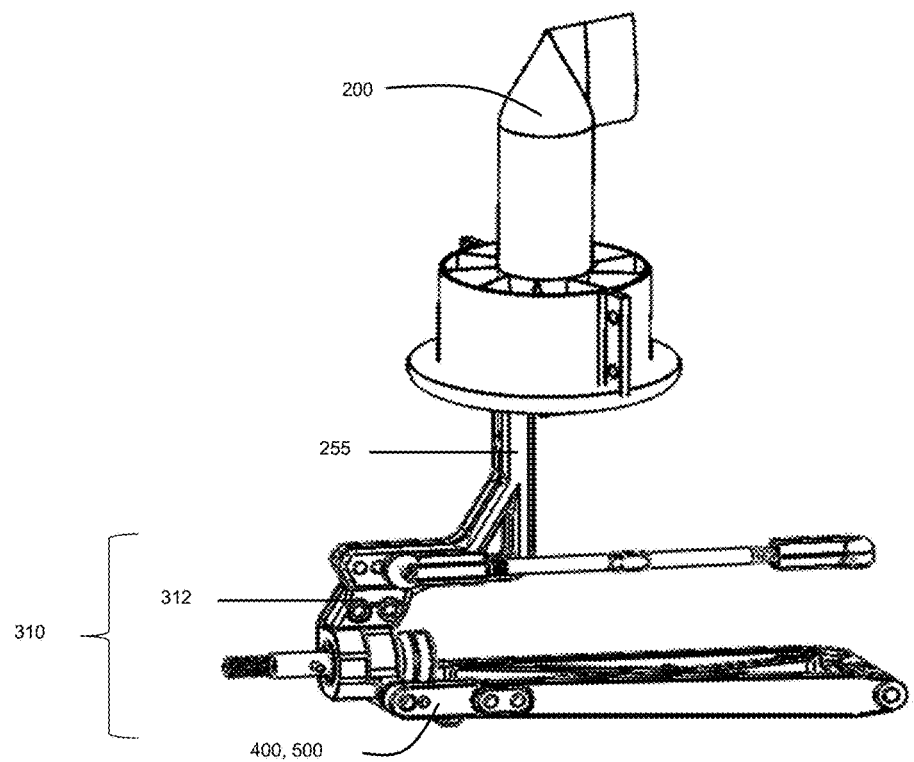
FIG. 8 is a perspective view of a thruster mounted to the suspension system of a vehicle.

Referring now to FIG. 8, a sub-assembly of the vehicle traction enhancement system is shown. As illustrated, the traction enhancement system may include one or more thrusters 200. Each thruster 200 may be connected to the suspension knuckle 312 of the vehicle so that the thrusters 200 are positioned over one or more wheel assemblies of the vehicle, positioned over one or more axles of the vehicle, or both. For example, as shown, the thruster 200 may be connected via a thrust mount 255 to linkage interconnecting a wheel and the chassis of the vehicle, such as a suspension knuckle, camber control link, control arm, A-arm, trailing arm, wheel spindle, or a combination thereof. Thus, the components that create the overall suspension, body, and/or chassis of a vehicle may be utilized to mount the thruster 200. Advantageously, the present teachings provide a thruster 200 that may be mounted anywhere along the vehicle based on packaging requirements, cost optimization, vehicle performance, or a combination thereof.

Figure 9:
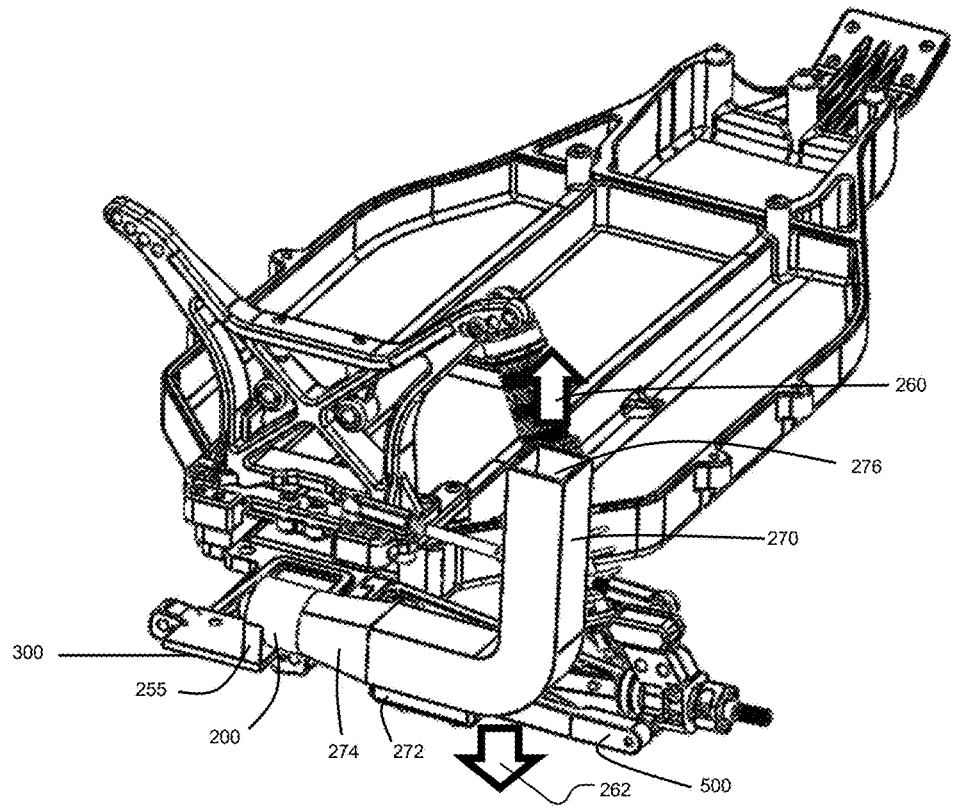
FIG. 9 is a perspective view of a thruster mounted to a vehicle chassis and a duct mounted to a control arm of a suspension system of a vehicle.

FIG. 9 illustrates a thruster 200 of a traction enhancement system. Similar to the thruster shown in FIG. 8, the thruster 200 may be secured to the vehicle suspension 310, body 20, and/or chassis structure 300 by a thrust mount 255. As illustrated, the thrust mount 255 may secure the thruster 200 to the chassis 300 of the vehicle. The thruster 200 may be interconnected to a duct 270 so that an upward thrust 260 generated by the thruster 200 travels through the duct 270 and exits a duct outlet 276, thereby generated a reactive downward force 262 to improve traction between tires of the vehicle and the ground. The thruster 200 may be connected to the duct 270 via a coupler 274. The coupler 274 may be flexible, tapered, or otherwise adjustable such that the connection between the thruster 200 and the duct 270 is cohesive and fluid to efficiently direct a thrust fluid from the thruster 200 through the duct 270. The coupler 274 may secure to the thruster 200, the duct 270, or both via one or more fasteners, adhesives, or both. The coupler 274 may also be free of fasteners and adhesives such that the coupler 274 creates a press-fit condition between the coupler 274 and the thruster 200, the duct 270, or both.

Additionally, the duct 270 may also be secured to the suspension 310 of the vehicle like the thruster 200. For example, the duct 270 may include a duct mount 272 that secures the duct 270 to the control arm 500 of the vehicle.

As shown, the duct mount 272 may secure the duct 270 to a control arm 500 of the vehicle.

Figure 10:
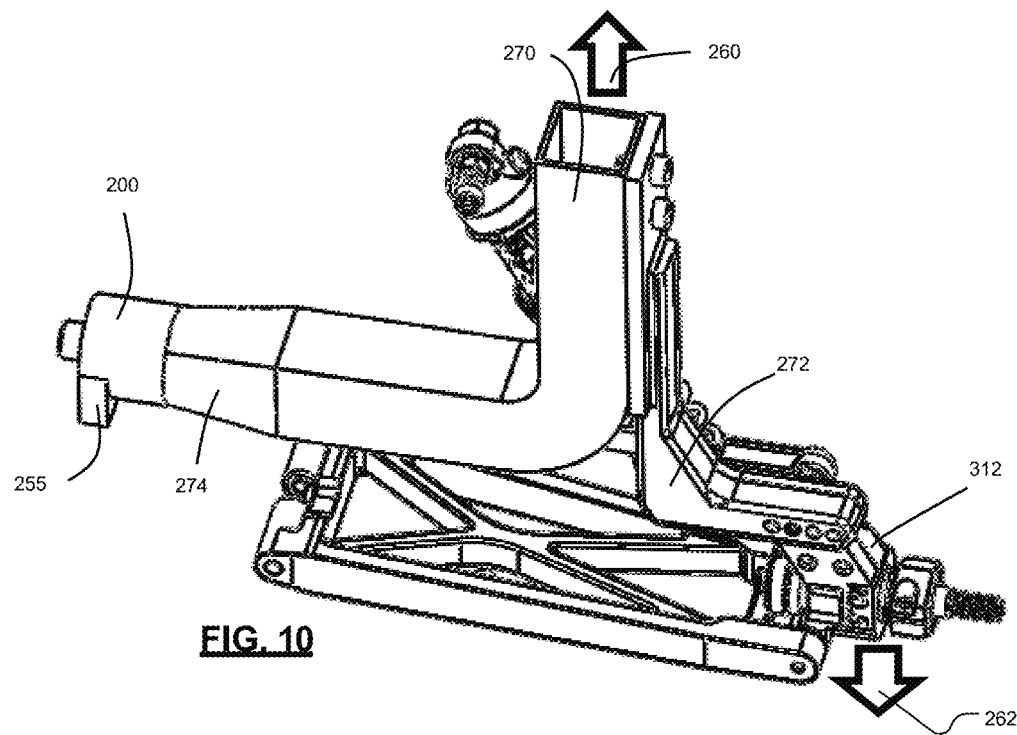
FIG. 10 is a perspective view of a thruster and duct mounted to a knuckle of a suspension system of a vehicle.

FIG. 10 illustrates a thruster 200 similar to the thruster 200 shown in FIG. 9. As illustrated, the thruster 200 may include a thrust mount 255 that secures the thruster 200 to the suspension 310, body 20, and/or the chassis 300 of the vehicle. The thruster 200 may be connected to a duct 270 via a coupler 274 interconnecting the thruster 200 and the duct 270. The duct 270 may include a duct mount 272 that secures the duct 270 to a suspension knuckle 312 of the vehicle. While FIG. 9 shows that the duct 270 is secured to a control arm 500 of the vehicle, FIG. 10 alternatively illustrates that the duct 270 may be secured via the duct mount 272 to a suspension knuckle 312, thereby positioning the thruster 200 centrally to a wheel assembly secured to the suspension knuckle 312.

Figure 11:
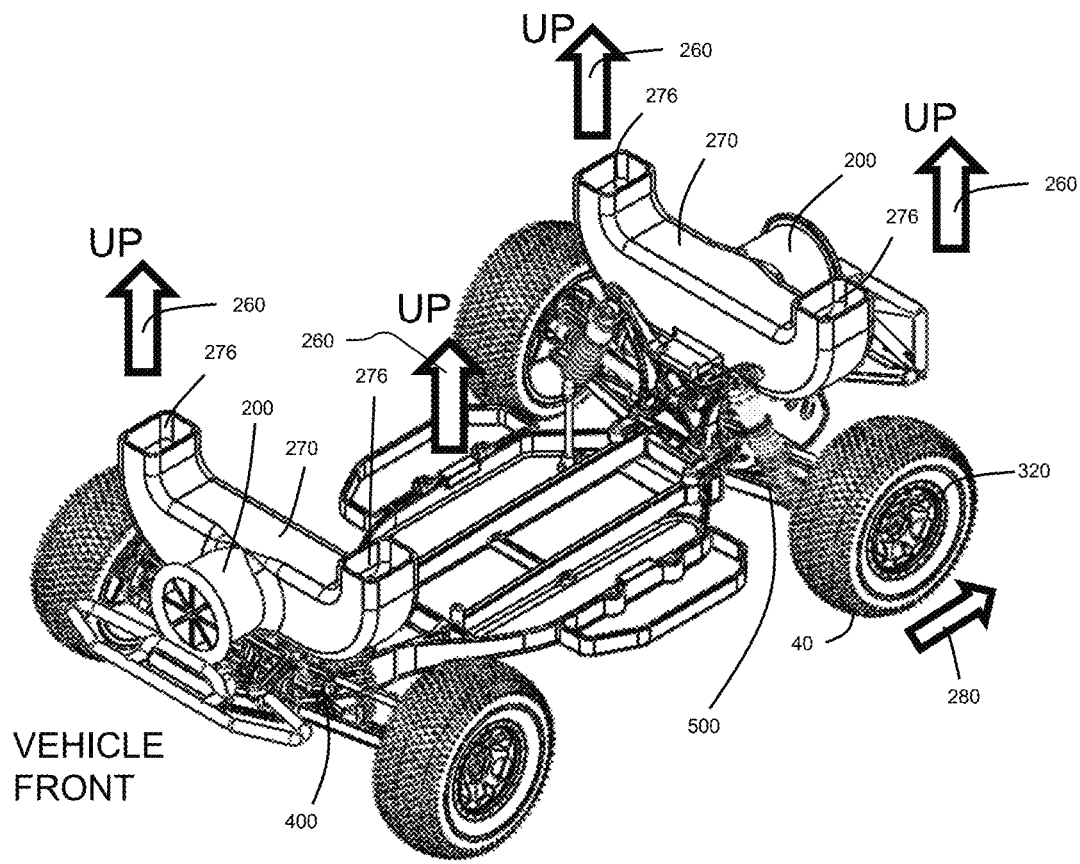
FIG. 11 is a perspective view of the vehicle traction enhancement system having a plurality of thrusters connecting to ducting.

FIG. 11 illustrates a perspective view of a vehicle traction enhancement system as described herein. The vehicle traction enhancement system may include a pair of thrusters 200 centrally positioned along a longitudinal axis of the vehicle. Advantageously, the thrusters 200 may be located along a front axle 800 and a rear axle 900 of the vehicle to generate an upward thrust 260 near each of the four wheel assemblies 320 of the vehicle. Beneficially, a single thruster 200 may generate an upward thrust force 260 near both wheel assemblies 320 along the front axle 800, the rear axle 900, or both. Thus, a vehicle system may require less thrusters 200 yet still provide sufficient upward force 260 to generate a reactive downward force 262 to improve the tractive force 280 between the tires 40 and the ground. For example, it is envisioned that the vehicle system may require only two or even a single thruster 200 to generate a force at each of the four wheel assemblies 320.

To create such an upward thrust, the thrusters 200 may be connected to a duct 270 extending from the thrusters 200 to a position near each of the wheel assemblies 320. The ducts 270 may include one or more duct outlets 276 that direct the upward thrust 260 substantially vertical and away from the ground beneath the vehicle. However, it should be noted that the thrust may be oriented in any desired direction based upon the shaping of the ducts 270. Therefore, the ducts 270 may beneficially decrease the number of thrusters 200 required in each vehicle, may allow for improved packaging within the vehicle based upon the flexibility of the ducts 270, or both.

Figure 12:
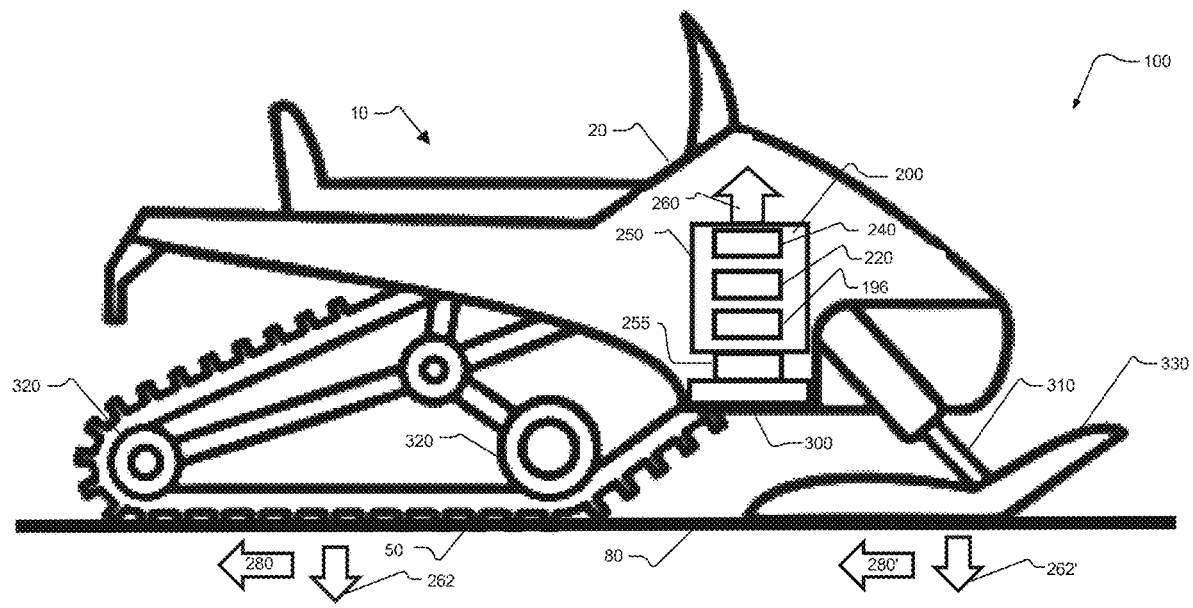
FIG. 12 is a side view of a vehicle traction enhancement system of a snowmobile.

FIG. 12 illustrates a side view of a vehicle with a traction enhancement system 100. As shown, the vehicle 10 may be a snowmobile configured to move along a ground support surface 80 via a track 50 in communication with a plurality of wheel assemblies 320. A thruster 200 may be mounted along and/or within a body 20 of the snowmobile, a chassis 300 of the snowmobile, or both via a thruster mount 255 to generate an upward thrust 260 as described above. However, it should also be noted that the thruster 200 may have one or more mounts also along a suspension 310 of the snowmobile based on packaging needs.

Similar to the thrusters 200 described above, the upward thrust 260 may be generated via a pressurized fluid traveling from an air pressure generator 240 through a prime mover 220 and/or a control valve 196 contained within a thruster housing 250. It should be noted that one or more additional components may also be incorporated into the thruster 200 that have been omitted for simplicity. Once the upward thrust 260 is generated, a reactive downward force 262 occurs, thereby creating improved tractive force 280 between the track 50 and the ground support surface 80, between a ski assembly 330 and the ground support surface 80, or both.

Figure 13:
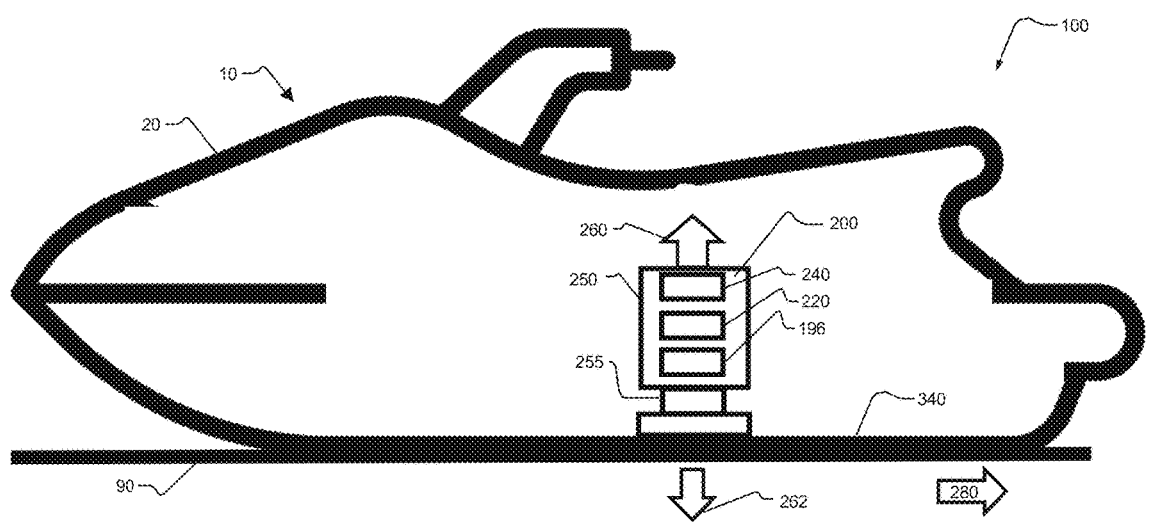
FIG. 13 is a side view of a vehicle traction enhancement system of a jet ski.
Figure 14:
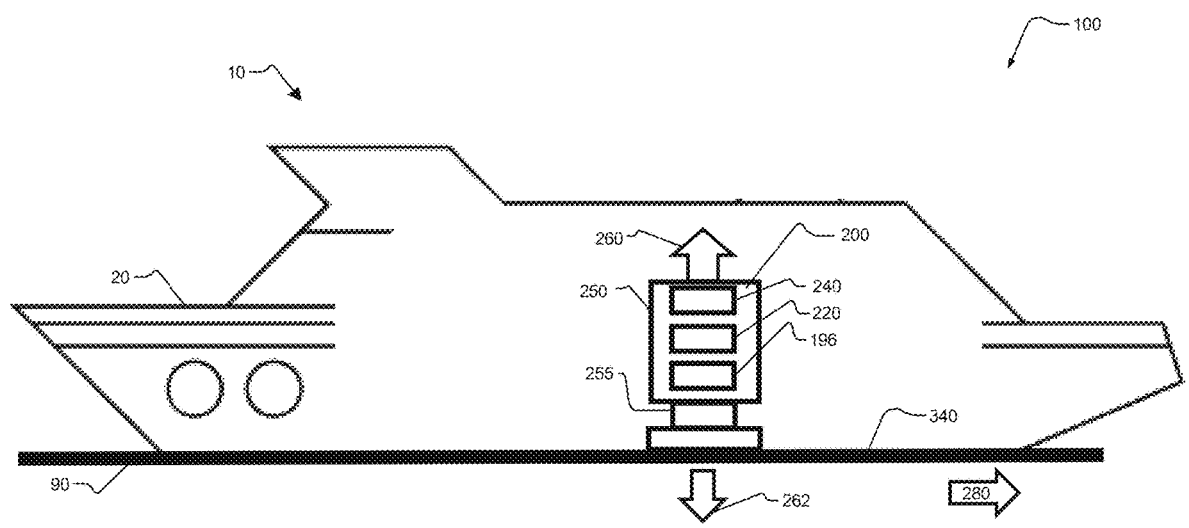
FIG. 14 is a side view of a vehicle traction enhancement system of a boat.

Similar to the snowmobile configuration illustrated in FIG. 12, FIGS. 13 and 14 illustrates a thruster 200 mounted within a jet ski and a boat, respectively. The thruster 200 may have the same or different configuration than the thruster 200 of the snowmobile as described. However, for simplicity, the thrusters 200 of FIGS. 13 and 14 are illustrated as having the same configuration to that of FIG. 12. As shown, the thruster 200 may be mounted along or within a hull 340 of the jet ski or boat to generate an upward thrust 260. The upward thrust 260 may thus create a reactive downward force 260, thereby creating an improved tractive force 280 between the hull 340 of the jet ski or the boat and a water support surface 90.

Thus, as may be gleaned from FIGS. 12-14, the present teachings may advantageously provide a vehicle traction enhancement system 100 adaptable for a variety of vehicles. As described herein, the vehicle may be a marine vehicle such as a boat or a jet ski, a ground vehicle such as a car, truck, bicycle, tricycle, motorcycle, snowmobile, or a combination thereof, or any other type of vehicle that may otherwise benefit from improve traction between a contact surface of the vehicle and a support surface, such as water or the ground. It should be noted that the vehicle traction enhancement system 100 may be configurable and tunable to meet the needs and/or packaging or each specific type of vehicle. For example, ducting as described herein may be utilized to route an intake opening and/or a thruster outlet opening to desired points along the vehicle. Thus, the vehicle traction enhancement system 100 may be configured to meet the tight constraints of any vehicle industry and are not limited to any specific type of vehicle.

The broad teachings of the disclosure can be implemented in a variety of forms. For example, the "vehicle" mentioned in the specification may be a full-size vehicle adapted for transportation or sports purposes. Alternatively, the "vehicle" may also be a scaled-down vehicle model adapted for entertainment or research purposes. Therefore, while this disclosure includes particular examples, the true scope of the disclosure should not be so limited since other modifications will become apparent to the skilled practitioner upon a study of the drawings, the specification, and the following claims.

The reference numbers in the Figures are listed below:
1 Vehicle traction enhancement system with single thruster
2 Vehicle traction enhancement system with dual axle thrusters
3 Vehicle traction enhancement system with quadruple corner thrusters
10 Vehicle
20 Body
40 Tire
50 Track
80 Ground support surface
90 Water support surface
100 Vehicle with traction enhancement system
120 Thrust control module
125 Control signal line
140 Energy storage
145 Energy supply line
160 Vehicle control module
180 Sensing devices
182 Gyroscope
184 Accelerometer
185 Vehicle speed sensor 186 Steering angle sensor
188 Throttle position sensor
190 Brake pressure sensor
192 Compressor
194 Regulator
196 Control Valve
198 Pump
200 Thruster
210 Thruster intake end
215 Thruster exhaust end
220 Prime mover
230 Air stream stabilizer
231 Aft cone
238 Propulsion system
240 Air pressure generator
250 Thruster housing
255 Thruster mount
260 Upward thrust
262 Downward normal force
270 Duct
272 Duct Mount
274 Coupler
276 Duct Outlet
278 Inlet Duct
280 Tractive force
300 Chassis structure
310 Vehicle Suspension
312 Suspension knuckle
320 Wheel assembly
330 Ski assembly
340 Hull
400 Front control arm
500 Rear control arm
602 Left front wheel
604 Right front wheel
606 Left rear wheel
608 Right rear wheel
702 Vehicle left front corner
704 Vehicle right front corner
706 Vehicle left rear corner
708 Vehicle right rear corner
800 Front axle
900 Rear axle

What is claimed is:

1. A vehicle traction enhancement system comprising:
(a) an energy storage that provides an energy for operation of the vehicle traction enhancement system; and
(b) a thruster in communication with the energy storage and configured to mount on a vehicle, wherein the thruster creates an upward thrust using the energy received from the energy storage with respect to the vehicle to generate an increased reactive downward normal force, thereby increasing a tractive force between the vehicle and a surface supporting the vehicle; and
wherein the thruster is in fluid communication with a plurality of ducts, and each of the plurality of ducts includes an air inlet from outside, inside, or under the vehicle and a duct outlet positioned near a different wheel assembly to guide the upward thrust generated by the thruster; and
wherein the thruster includes:
(i) a prime mover that converts the energy received by the thruster to a rotational kinetic energy; and
(ii) GD an air pressure generator that receives a working fluid and increases a pressure, a momentum, or both of the working fluid using the rotational kinetic energy to create the upward thrust.

2. The vehicle traction enhancement system of claim 1, wherein an amount of the energy received by the thruster from the energy storage is based upon a thruster control signal generated by a thruster control module in electrical communication with the thruster.

3. The vehicle traction enhancement system of claim 2, wherein the thruster control module is in electrical communication with a vehicle control module that operates the thruster control module.

4. The vehicle traction enhancement system of claim 1, wherein the energy storage stores electric energy, and the energy storage is a battery, a supercapacitor, an ultracapacitor, or a combination thereof.

5. The vehicle traction enhancement system of claim 1, wherein the vehicle traction enhancement system includes a compressor that compresses the working fluid stored in vessels of the energy storage.

6. The vehicle traction enhancement system of claim 1, wherein the vehicle traction enhancement system includes a pump that pressurizes the working fluid stored in vessels of the energy storage.

7. The vehicle traction enhancement system of claim 1, wherein the vehicle traction enhancement system includes a regulator that regulates the pressure of the working fluid when travelling between the energy storage and the thruster.

8. The vehicle traction enhancement system of claim 7, wherein the thruster includes a valve controlling the release of the working fluid from the energy storage after travelling through the regulator; and wherein the valve is actuated by a thruster control signal generated by a thruster control module.

9. The vehicle traction enhancement system of claim 1, wherein the thruster includes a combustion engine, a turbofan engine, a gas turbine, a plasma engine, an electromagnetic propulsion system, an ion thruster, or a combination thereof.

10. The vehicle traction enhancement system of claim 1, wherein the thruster is mounted on the vehicle chassis structure near an axle of the vehicle.

11. The vehicle traction enhancement system of claim 10, wherein the axle includes opposing wheel assemblies secured on opposing ends of the axle and the thruster is mounted on the vehicle chassis structure substantially B-equidistant from the opposing wheel assemblies.

12. The vehicle traction enhancement system of claim 1, wherein the vehicle traction enhancement system includes a first group of thrusters mounted near a front axle of the vehicle and a second group of thrusters mounted near a rear axle of the vehicle, and the first group of thrusters generate the upward thrust near the front axle and the second group of thrusters generate the upward thrust near the rear axle.

13. The vehicle traction enhancement system of claim 1, wherein the thruster is mounted on the vehicle chassis structure near a wheel assembly of the vehicle.

14. The vehicle traction enhancement system of claim 13, wherein the thruster is mounted to the vehicle chassis structure via a thruster mount.

15. The vehicle traction enhancement system claim 1, wherein the thruster is mounted to a suspension system of the vehicle, and the suspension system of the vehicle includes a control arm, a trailing arm, a suspension knuckle, a wheel hub, a suspension upright, a camber control link, a wheel spindle, other wheel chassis linkage, or a combination thereof.

16. The vehicle traction enhancement system of claim 1, wherein the thruster is mounted to a vehicle body via a thruster mount.

17. The vehicle traction enhancement system of claim 1, wherein the plurality of ducts are physically mounted to a control arm, a trailing arm, a wheel hub, a suspension upright, a suspension knuckle, or a combination thereof of a suspension system of the vehicle.

18. The vehicle traction enhancement system of claim 1, wherein the plurality of ducts are in fluid communication with a thruster intake.

19. A vehicle traction enhancement system comprising:
(a) an energy storage that provides an energy for operation of the vehicle traction enhancement system; and
(b) a thruster in communication with the energy storage and configured to mount on a vehicle, wherein the thruster creates an upward thrust using the energy received from the energy storage with respect to the vehicle to generate an increased reactive downward normal force, thereby increasing a tractive force between the vehicle and a surface supporting the vehicle;
wherein the thruster is in fluid communication with a plurality of ducts, and each of the plurality of ducts includes an air inlet from outside, inside, or under the vehicle and a duct outlet positioned near a different wheel assembly to guide the upward thrust generated by the thruster;
wherein the thruster includes:
  (i) a prime mover that converts the energy received by the thruster to a rotational kinetic energy; and
  (ii) an air pressure generator that receives a working fluid and increases a pressure, a momentum, or both of the working fluid using the rotational kinetic energy to create the upward thrust; and
wherein the energy storage stores electric energy, and the energy storage is a battery, a supercapacitor, an ultra-capacitor, or a combination thereof.

20. A vehicle traction enhancement system comprising:
(a) an energy storage that provides an energy for operation of the vehicle traction enhancement system; and
(b) a thruster in communication with the energy storage and configured to mount on a vehicle, wherein the thruster creates an upward thrust using the energy received from the energy storage with respect to the vehicle to generate an increased reactive downward normal force, thereby increasing a tractive force between the vehicle and a surface supporting the vehicle;
wherein the thruster is in fluid communication with a plurality of ducts, and each of the plurality of ducts includes an air inlet from outside, inside, or under the vehicle and a duct outlet positioned near a different wheel assembly to guide the upward thrust generated by the thruster; and
wherein the thruster is mounted to a suspension system of the vehicle, and the suspension system of the vehicle includes a control arm, a trailing arm, a suspension knuckle, a wheel hub, a suspension upright, a camber control link, a wheel spindle, other wheel chassis linkage, or a combination thereof.

* * * * *